United States Patent
Klimek

[15] 3,653,722
[45] Apr. 4, 1972

[54] FRONT BRAKE VALVE
[72] Inventor: Boleslaw Klimek, Des Plaines, Ill.
[73] Assignee: Berg Mfg. & Sales Co., Des Plaines, Ill.
[22] Filed: July 27, 1970
[21] Appl. No.: 58,552

[52] U.S. Cl. ............................................. 303/6 C, 137/102
[51] Int. Cl. ..................................... B60t 15/36, G05d 11/03
[58] Field of Search ............... 137/102; 188/151 A; 303/6 C, 303/6 R, 59, 62

[56] References Cited

UNITED STATES PATENTS

| | | |
|---|---|---|
| 3,420,256 | 1/1969 | Kobnick ........................ 303/6 C UX |
| 3,492,052 | 1/1970 | Klimek ............................... 303/6 C |
| 3,499,688 | 3/1970 | Reynolds ........................... 303/6 C |
| 3,526,437 | 9/1970 | Lewis ................................ 303/6 C |
| 3,547,498 | 12/1970 | Bueler .............................. 303/6 C |

Primary Examiner—Duane A. Reger
Attorney—Parker, Carter & Markey

[57] ABSTRACT

A valve assembly for varying brake pressures applied to front vehicle wheels including a differential piston, a second piston effective against said differential piston and positive exhaust closing means.

4 Claims, 2 Drawing Figures

PATENTED APR 4 1972  3,653,722

INVENTOR.
Boleslaw Klimek
BY Parker, Carter & Markey
Attorneys.

FRONT BRAKE VALVE

OBJECTS OF THE INVENTION

This invention relates to vehicle fluid pressure brake systems and particularly to automatic control valves effective to provide varying brake pressures within said systems.

One purpose of the invention is to provide a valve automatically effective to apply fluid pressure to front axle brakes at varying levels throughout the available system pressures.

Another purpose is to provide a valve arrangement automatically transmitting an initial predetermined pressure in response to brake application, a decreasing ratio of outlet to inlet pressures in response to continued brake application, an increasing ratio of said pressures in response to still further brake application and to transmit a predetermined pressure in response to still further brake application.

Another purpose is to provide a valve effective to modulate system pressure delivered to front axle brakes.

Another purpose is to provide a valve of the type described having positive means insuring against inadvertent exhaust.

Other purposes may appear from time to time during the course of the specification and claims.

BRIEF DESCRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
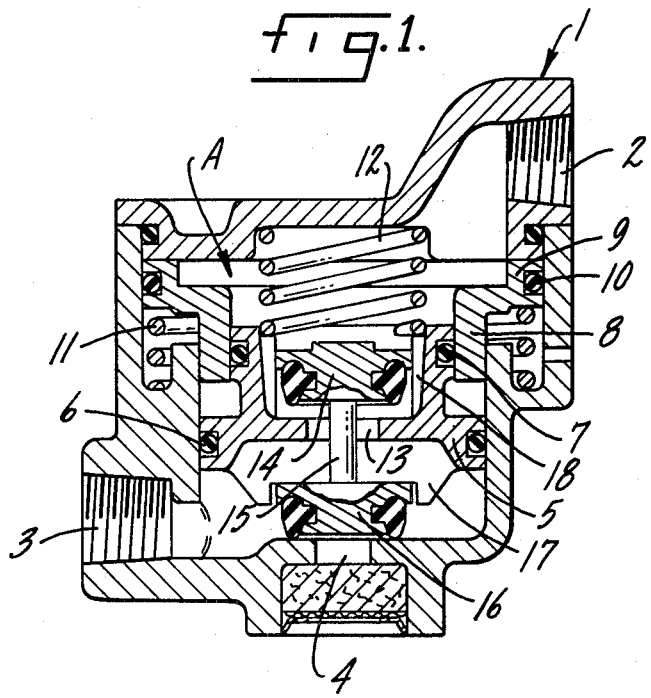
FIG. 1 is a side view in cross section.

A housing 1 has formed therein an inlet 2 and one or more outlets 3, the inlet and outlet ports 2,3 communicating with a central chamber generally designated at A. An exhaust outlet 4 also communicates with chamber A.

Reciprocal in chamber A is a differential piston 5, the major diameter of which carries a seal 6 in contact with the inner walls defining a portion of chamber A. The minor diameter of piston 5 carries a seal 7 in sealing engagement with a cylindrical, hollow sleeve or extension 8 carried by a larger piston 9. The major diameter of piston 9 is greater than either diameter of piston 5 and carries seal 10 in engagement with a wall of housing 1 defining an enlarged portion of chamber A.

Spring 11 urges piston 9 upwardly, as the parts are shown, toward inlet 2 and away from piston 5. Spring 12 urges piston 5 in the opposite direction and toward outlet 3.

Piston 5 is apertured as at 13 to communicate inlet 2 with outlet 3 when the upper head 14 of dual-headed valve member 15 is off the seat surrounding aperture 13 in piston 5. The other head 16 of member 15 is positioned for seating about and closing exhaust outlet 4. A plurality of circumferentially spaced legs 17 depend from piston 5 for engagement with the head 16.

A series of circumferentially spaced ribs 18 are formed within the cup-shaped portion of piston 5 to guide the head 14 and to permit passage of fluid pressure thereabout.

The use and operation of the invention are as follows.

Figure 2:
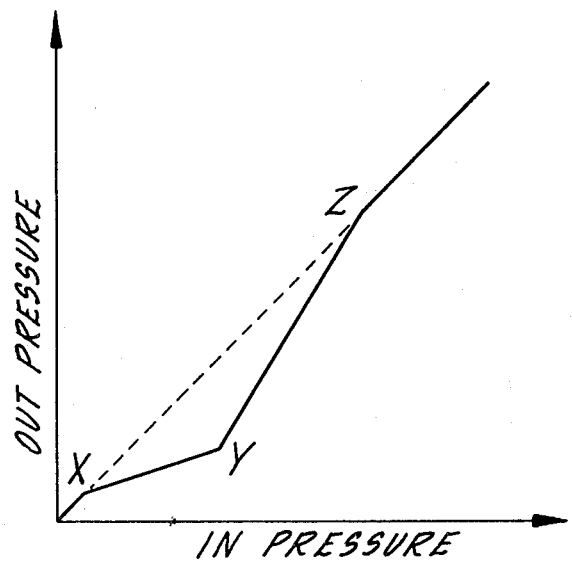
FIG. 2 is a diagrammatic illustration of the action of the device of the invention.

The operation of the device of the invention corresponds substantially to that described and disclosed in my prior U.S. Pat. No. 3,492,052 entitled "Front Axle Valve" and issued Jan. 27, 1970. In essence, the valve of the invention automatically insures passage of full system pressure supplied at inlet 2 through the outlet or outlets 3 to the front wheel brakes until the brake shoes thereof have been brought into contact with the associated brake drums. Thereafter a modulation takes place as the fluid pressure builds first beneath piston 5 and then above the piston 9 and piston 5. It will be observed that the effective area of piston 9 is greater than that of the major diameter of piston 5 and the latter is greater than its minor diameter slidable within piston 9. Thus, as shown in FIG. 2, a decreasing portion of the pressure supplied at inlet 2 is delivered as brake application continues, the indication thereof being shown by the line XY. Thereafter, as indicated by the line YZ, an increasing proportion of system pressure is delivered through outlets 3 and thereafter full system pressure is again delivered through the device of the invention.

It will be observed that the legs 17 carried by piston 5 are positioned to engage the exhaust controlling valve head 16, to center the valve head thereon and to guarantee closure of the exhaust head 16 when piston 5 is in the position shown. Valve member 15 is free to float vertically within piston 5, being merely guided or centered by ribs 18. Thus the valve of the invention provides a close, controlled modulation responsive only to the movement of pistons 5 and 9, there being no need for reliance upon a separate spring controlling valve member 15 and piston 5, in its normal position prior to brake application, guarantees closing of exhaust outlet 4 and precludes escape of incoming system pressure.

When brake application, and hence pressure at inlet 2, ceases, spring 11 returns piston 9 to the position shown and the pressure in the front axle brake chambers and lines (not shown) moves piston 5 upwardly to contact head 14 and to raise head 16 to exhaust the front axle brakes and the valve of the invention. Thereafter the relatively weaker spring 12 returns piston 5 and head 16 to the position shown, automatically readying the valve for the next brake application.

The embodiments of the invention in which an exclusive property or privilege is claimed are defined as follows:

1. A valve including a housing, an inlet, an outlet, a differential piston reciprocal in said housing between said inlet and said outlet, said piston having a smaller surface presented to said inlet and a larger surface presented to said outlet, a passage through said piston communicating said inlet and outlet, a valve element positioned to control said passage, yielding means urging said differential piston toward passage-open position, and a second piston, said second piston having a surface presented to said inlet and larger than either surface of said differential piston, said second piston having a portion engageable with said differential piston to urge said differential piston toward said passage-open position to response to delivery of fluid pressure at said inlet above a predetermined level, an exhaust outlet in said housing, a valve positioned to close said exhaust outlet, and an extension carried by said differential piston and positioned for operating contact with said exhaust valve to urge the same into exhaust outlet closing position in response to said yielding means.

2. The structure of claim 1 wherein said valve element and said exhaust valve element are joined for unitary movement and freely carried by said differential piston in floating relationship therewith.

3. The structure of claim 2 characterized by and including circumferentially spaced guide vanes carried by said differential piston and engaging and centering said valve element.

4. The structure of claim 1 wherein said exhaust valve, when seated, serves as a limit stop abutment in the excursion of said differential piston in response to said yielding means.

* * * * *